(12) United States Patent  (10) Patent No.: US 8,676,674 B2
Perlman  (45) Date of Patent: Mar. 18, 2014

(54) PEER-TO-PEER AND GROUP FINANCIAL MANAGEMENT SYSTEMS AND METHODS

(75) Inventor: Jeffrey William Perlman, Gordon (AU)

(73) Assignee: Visa International Service Association, Foster City, CA (US)

( * ) Notice: Subject to any disclaimer, the term of this patent is extended or adjusted under 35 U.S.C. 154(b) by 0 days.

(21) Appl. No.: 13/613,374

(22) Filed: Sep. 13, 2012

(65) Prior Publication Data

US 2013/0013494 A1  Jan. 10, 2013

Related U.S. Application Data

(63) Continuation of application No. 12/778,459, filed on May 12, 2010, now Pat. No. 8,280,788.

(60) Provisional application No. 61/256,147, filed on Oct. 29, 2009.

(51) Int. Cl.
*G06Q 40/02* (2012.01)
*G06Q 40/00* (2012.01)
*G06Q 20/10* (2012.01)
*G06Q 30/04* (2012.01)

(52) U.S. Cl.
USPC ................................. 705/30; 705/39; 705/40

(58) Field of Classification Search
USPC ................. 705/30, 21, 14.35, 1, 39
See application file for complete search history.

(56) References Cited

U.S. PATENT DOCUMENTS

| | | |
|---|---|---|
| 3,652,795 A | 3/1972 | Wolf et al. |
| 4,321,672 A | 3/1982 | Braun et al. |
| 4,341,951 A | 7/1982 | Benton |
| 4,454,414 A | 6/1984 | Benton |
| 4,645,873 A | 2/1987 | Chomet |
| 4,713,761 A | 12/1987 | Sharpe et al. |
| 4,750,119 A | 6/1988 | Cohen et al. |
| 4,823,264 A | 4/1989 | Deming |

(Continued)

FOREIGN PATENT DOCUMENTS

| | | |
|---|---|---|
| AU | 640855 | 9/1993 |
| WO | 9613814 | 5/1996 |
| WO | 0205224 | 1/2002 |

OTHER PUBLICATIONS

Pilon, Mary, "PayPal Makes a Bid for Student Banking", downloaded from http://blogs.wsj.com/digits/2009/08/14/paypal-makes-a-bid-for-student-banking/tab/article, 3 pp. (Aug. 14, 2009).

(Continued)

*Primary Examiner* — Matthew Gart
*Assistant Examiner* — Reva R Danzig
(74) *Attorney, Agent, or Firm* — Jones Day

(57) ABSTRACT

This relates to transferring funds from a payer to a payee in a electronic payment system. The electronic payment system includes a payment processor and an accounts database. The payment processor receives a payment request from the payer. The payment request includes information to identify the payee and a payment amount. An accounts database is accessed to determine if the accounts database includes an account associated with the payee. Based on a determination that the accounts database includes an account associated with the payee, an electronic message is sent from the payment processor to the payee, to notify the payee of the payment request. The accounts database is accessed to determine if the payee is identified as having a trusted relationship with the payer.

18 Claims, 12 Drawing Sheets

(56) References Cited

U.S. PATENT DOCUMENTS

| | | |
|---|---|---|
| RE32,985 E | 7/1989 | Nagata et al. |
| 4,866,611 A | 9/1989 | Cree et al. |
| 4,941,090 A | 7/1990 | McCarthy |
| 5,010,485 A | 4/1991 | Bigari |
| 5,025,372 A | 6/1991 | Burton et al. |
| 5,132,521 A | 7/1992 | Smith et al. |
| 5,220,501 A | 6/1993 | Lawlor et al. |
| 5,231,571 A | 7/1993 | D'Agostino |
| 5,326,960 A | 7/1994 | Tannenbaum |
| 5,329,589 A | 7/1994 | Fraser et al. |
| 5,350,906 A | 9/1994 | Brody et al. |
| 5,351,296 A | 9/1994 | Sullivan |
| 5,383,113 A | 1/1995 | Kight et al. |
| 5,412,730 A | 5/1995 | Jones |
| 5,440,634 A | 8/1995 | Jones et al. |
| 5,450,537 A | 9/1995 | Hirai et al. |
| 5,453,601 A | 9/1995 | Rosen |
| 5,455,407 A | 10/1995 | Rosen |
| 5,537,314 A | 7/1996 | Kanter |
| 5,557,516 A | 9/1996 | Hogan |
| 5,581,764 A | 12/1996 | Fitzgerald et al. |
| 5,623,547 A | 4/1997 | Jones et al. |
| 5,640,577 A | 6/1997 | Scharmer |
| 5,659,165 A | 8/1997 | Jennings et al. |
| 5,692,132 A | 11/1997 | Hogan |
| 5,699,528 A | 12/1997 | Hogan |
| 5,717,989 A | 2/1998 | Tozzoli et al. |
| 5,742,845 A | 4/1998 | Wagner |
| 5,745,574 A | 4/1998 | Muftic |
| 5,790,790 A | 8/1998 | Smith et al. |
| 5,793,302 A | 8/1998 | Stambler |
| 5,794,259 A | 8/1998 | Kikinis |
| 5,799,087 A | 8/1998 | Rosen |
| 5,815,657 A | 9/1998 | Williams et al. |
| 5,832,463 A | 11/1998 | Funk |
| 5,850,442 A | 12/1998 | Muftic |
| 5,862,325 A | 1/1999 | Reed et al. |
| 5,873,072 A | 2/1999 | Kight et al. |
| 5,884,288 A | 3/1999 | Chang et al. |
| 5,884,312 A | 3/1999 | Dustan et al. |
| 5,890,140 A | 3/1999 | Clark et al. |
| 5,893,120 A | 4/1999 | Nemes |
| 5,903,881 A | 5/1999 | Schrader et al. |
| 5,920,629 A | 7/1999 | Rosen |
| 5,946,667 A | 8/1999 | Tull et al. |
| 5,953,423 A | 9/1999 | Rosen |
| 5,956,391 A | 9/1999 | Melen et al. |
| 5,956,700 A | 9/1999 | Landry |
| 5,960,411 A | 9/1999 | Hartman et al. |
| 5,963,647 A | 10/1999 | Downing et al. |
| 5,966,696 A | 10/1999 | Giraud |
| 5,966,698 A | 10/1999 | Pollin |
| 5,974,148 A | 10/1999 | Stambler |
| 5,974,430 A | 10/1999 | Mutscher, III et al. |
| 6,012,041 A | 1/2000 | Brewer et al. |
| 6,012,044 A | 1/2000 | Maggioncalda et al. |
| 6,012,045 A | 1/2000 | Barzilai et al. |
| 6,012,048 A | 1/2000 | Gustin et al. |
| 6,029,150 A | 2/2000 | Kravitz |
| 6,032,133 A | 2/2000 | Hilt et al. |
| 6,067,621 A | 5/2000 | Yu et al. |
| 6,088,717 A | 7/2000 | Reed et al. |
| 6,092,053 A | 7/2000 | Boesch et al. |
| 6,173,272 B1 | 1/2001 | Thomas et al. |
| 6,192,407 B1 | 2/2001 | Smith et al. |
| 6,226,624 B1 | 5/2001 | Watson et al. |
| 6,227,447 B1 | 5/2001 | Campisano |
| 6,289,322 B1 | 9/2001 | Kitchen et al. |
| 6,327,578 B1 | 12/2001 | Linchan |
| 6,330,550 B1 | 12/2001 | Brisebois et al. |
| 6,332,134 B1 | 12/2001 | Foster |
| 6,341,724 B2 | 1/2002 | Campisano |
| 6,351,739 B1 | 2/2002 | Egendorf |
| 6,360,205 B1 | 3/2002 | Iyengar et al. |
| 6,421,729 B1 | 7/2002 | Paltenghe et al. |
| 6,424,249 B1 | 7/2002 | Houvener |
| 6,467,684 B2 | 10/2002 | Fite et al. |
| 6,487,599 B1 | 11/2002 | Smith et al. |
| 6,490,601 B1 | 12/2002 | Markus et al. |
| 6,499,042 B1 | 12/2002 | Markus |
| 6,547,129 B2 | 4/2003 | Nichols et al. |
| 6,609,113 B1 | 8/2003 | O'Leary et al. |
| 6,748,367 B1 | 6/2004 | Lee |
| 6,757,710 B2 | 6/2004 | Reed |
| 6,850,996 B2 | 2/2005 | Wagner |
| 6,871,288 B2 | 3/2005 | Russikoff |
| 6,873,974 B1 | 3/2005 | Schutzer |
| 6,907,476 B2 | 6/2005 | Wagner |
| 6,915,271 B1 | 7/2005 | Meyer et al. |
| 6,932,268 B1 | 8/2005 | McCoy et al. |
| 6,963,843 B1 | 11/2005 | Takatsu et al. |
| 7,006,993 B1 | 2/2006 | Cheong et al. |
| 7,062,706 B2 | 6/2006 | Maxwell et al. |
| 7,089,208 B1 | 8/2006 | Levchin et al. |
| 7,092,913 B2 | 8/2006 | Cannon, Jr. |
| 7,099,850 B1 | 8/2006 | Mann, II et al. |
| 7,103,571 B2 | 9/2006 | Shigemi et al. |
| 7,127,427 B1 | 10/2006 | Casper |
| 7,159,180 B2 | 1/2007 | Ward |
| 7,175,074 B2 | 2/2007 | Mejias et al. |
| 7,177,838 B1 | 2/2007 | Ling |
| 7,216,292 B1 | 5/2007 | Snapper et al. |
| 7,231,372 B1 | 6/2007 | Prange et al. |
| 7,249,097 B2 | 7/2007 | Hutchison et al. |
| 7,249,099 B2 | 7/2007 | Ling |
| 7,251,656 B2 | 7/2007 | Keown et al. |
| 7,254,569 B2 | 8/2007 | Goodman et al. |
| 7,257,581 B1 | 8/2007 | Steele et al. |
| 7,260,724 B1 | 8/2007 | Dickinson et al. |
| 7,324,972 B1 | 1/2008 | Oliver et al. |
| 7,328,189 B2 | 2/2008 | Ling |
| 7,334,184 B1 | 2/2008 | Simons |
| 7,337,144 B1 | 2/2008 | Blinn et al. |
| 7,337,953 B2 | 3/2008 | Sgambati et al. |
| 7,343,335 B1 * | 3/2008 | Olliphant .................... 705/36 R |
| 7,343,351 B1 | 3/2008 | Bishop et al. |
| 7,346,577 B1 | 3/2008 | Williams et al. |
| 7,346,587 B2 | 3/2008 | Goldstein et al. |
| 7,347,361 B2 | 3/2008 | Lovett |
| 7,350,139 B1 | 3/2008 | Simons |
| RE40,220 E | 4/2008 | Nichols et al. |
| 7,366,702 B2 | 4/2008 | David |
| 7,366,703 B2 | 4/2008 | Gray et al. |
| 7,376,621 B1 | 5/2008 | Ling |
| 7,379,919 B2 | 5/2008 | Hogan et al. |
| 7,392,536 B2 | 6/2008 | Jamieson et al. |
| 7,395,241 B1 | 7/2008 | Cook et al. |
| 7,412,420 B2 | 8/2008 | Holdsworth |
| 7,415,443 B2 | 8/2008 | Hobson et al. |
| 7,426,530 B1 | 9/2008 | Rosko et al. |
| 7,437,327 B2 | 10/2008 | Lam et al. |
| 7,437,757 B2 | 10/2008 | Holdsworth |
| 7,444,672 B2 | 10/2008 | Ellmore |
| 7,447,662 B2 | 11/2008 | Gibson |
| 7,458,507 B2 | 12/2008 | Fillinger et al. |
| 7,461,028 B2 | 12/2008 | Wronski, Jr. |
| 7,461,265 B2 | 12/2008 | Ellmore |
| 7,461,776 B2 | 12/2008 | Steiger, Jr. |
| 7,463,946 B2 | 12/2008 | Smith et al. |
| 7,471,818 B1 | 12/2008 | Price et al. |
| 7,472,171 B2 | 12/2008 | Miller et al. |
| 7,483,845 B2 | 1/2009 | Vetelainen |
| 7,487,127 B2 | 2/2009 | Weichert et al. |
| 7,496,952 B2 | 2/2009 | Edwards, Jr. et al. |
| 7,500,606 B2 | 3/2009 | Park et al. |
| 7,502,833 B2 | 3/2009 | Schaeck |
| 7,512,552 B2 | 3/2009 | Karas et al. |
| 7,519,560 B2 | 4/2009 | Lam et al. |
| 7,523,182 B2 | 4/2009 | Godwin |
| 7,533,063 B2 | 5/2009 | Kianian |
| 7,533,064 B1 | 5/2009 | Boesch |
| 7,533,828 B2 | 5/2009 | Ong |
| 7,536,354 B1 | 5/2009 | deGroeve et al. |
| 7,540,408 B2 | 6/2009 | Levine et al. |

(56) References Cited

U.S. PATENT DOCUMENTS

| | | | |
|---|---|---|---|
| 7,543,738 B1 | 6/2009 | Saunders et al. | |
| 7,546,272 B2 | 6/2009 | Loy | |
| 7,546,275 B1 | 6/2009 | Herzberg et al. | |
| 7,548,988 B2 | 6/2009 | Philyaw et al. | |
| 7,552,467 B2 | 6/2009 | Lindsay | |
| 7,568,631 B2 | 8/2009 | Gibbs et al. | |
| 7,571,140 B2 | 8/2009 | Weichert et al. | |
| 7,577,599 B2 | 8/2009 | Sanchez et al. | |
| 7,580,857 B2 | 8/2009 | VanFleet et al. | |
| 7,580,898 B2 | 8/2009 | Brown et al. | |
| 7,581,257 B1 | 8/2009 | O'Hara | |
| 7,584,153 B2 | 9/2009 | Brown et al. | |
| 7,590,595 B2 | 9/2009 | Pessin | |
| 7,606,760 B2 | 10/2009 | Hutchison et al. | |
| 7,610,233 B1 | 10/2009 | Leong et al. | |
| 7,627,523 B1 | 12/2009 | Symonds et al. | |
| 7,627,531 B2 | 12/2009 | Breck et al. | |
| 7,657,531 B2 | 2/2010 | Bisbee et al. | |
| 7,660,779 B2 | 2/2010 | Goodman et al. | |
| 7,664,699 B1 | 2/2010 | Powell | |
| 7,680,679 B1 | 3/2010 | Patricelli et al. | |
| 7,694,135 B2 | 4/2010 | Rowan et al. | |
| 7,698,221 B2 | 4/2010 | Blinn et al. | |
| 7,702,580 B1 | 4/2010 | Voth et al. | |
| 7,707,105 B2 | 4/2010 | O'Neil | |
| 7,711,621 B2 | 5/2010 | Huang et al. | |
| 7,716,596 B2 | 5/2010 | Cao et al. | |
| 7,729,925 B2 | 6/2010 | Maritzen et al. | |
| 7,761,374 B2 | 7/2010 | Sahota et al. | |
| 2001/0014878 A1 | 8/2001 | Mitra et al. | |
| 2001/0032182 A1 | 10/2001 | Kumar et al. | |
| 2001/0039535 A1 | 11/2001 | Tsiounis et al. | |
| 2001/0054148 A1 | 12/2001 | Hoornaert et al. | |
| 2001/0056405 A1 | 12/2001 | Muyres et al. | |
| 2002/0002495 A1 | 1/2002 | Ullman | |
| 2002/0004772 A1 | 1/2002 | Templeton et al. | |
| 2002/0016769 A1 | 2/2002 | Barbara et al. | |
| 2002/0046341 A1 | 4/2002 | Kazaks et al. | |
| 2002/0052841 A1 | 5/2002 | Guthrie et al. | |
| 2002/0059141 A1 | 5/2002 | Davies et al. | |
| 2002/0073027 A1 | 6/2002 | Hui et al. | |
| 2002/0083011 A1 | 6/2002 | Kobayashi | |
| 2002/0120582 A1 | 8/2002 | Elston et al. | |
| 2002/0184147 A1 | 12/2002 | Boulger | |
| 2003/0014633 A1 | 1/2003 | Gruber | |
| 2003/0061111 A1 | 3/2003 | Dutta et al. | |
| 2003/0074328 A1 | 4/2003 | Schiff et al. | |
| 2003/0097331 A1 | 5/2003 | Cohen | |
| 2003/0101134 A1 | 5/2003 | Liu et al. | |
| 2003/0101137 A1 | 5/2003 | Wronski, Jr. | |
| 2003/0110136 A1 | 6/2003 | Wells et al. | |
| 2003/0135434 A1 | 7/2003 | Jain | |
| 2003/0183689 A1 | 10/2003 | Swift et al. | |
| 2003/0197061 A1 | 10/2003 | Din | |
| 2003/0212642 A1 | 11/2003 | Weller et al. | |
| 2003/0233334 A1 | 12/2003 | Smith | |
| 2004/0039694 A1 | 2/2004 | Dunn et al. | |
| 2004/0044621 A1 | 3/2004 | Huang et al. | |
| 2004/0093303 A1 | 5/2004 | Picciallo | |
| 2004/0103057 A1 | 5/2004 | Melbert et al. | |
| 2004/0118914 A1 | 6/2004 | Smith et al. | |
| 2004/0122770 A1 | 6/2004 | Craig et al. | |
| 2004/0128508 A1 | 7/2004 | Wheeler et al. | |
| 2004/0148228 A1* | 7/2004 | Kwei | 705/26 |
| 2004/0236692 A1 | 11/2004 | Sellen et al. | |
| 2005/0005094 A1 | 1/2005 | Jamieson et al. | |
| 2005/0086169 A1 | 4/2005 | Wells et al. | |
| 2005/0097049 A1 | 5/2005 | Writer et al. | |
| 2005/0131816 A1 | 6/2005 | Britto et al. | |
| 2005/0147225 A1 | 7/2005 | Mallick et al. | |
| 2005/0149455 A1 | 7/2005 | Bruesewitz et al. | |
| 2005/0199709 A1 | 9/2005 | Linlor | |
| 2005/0211763 A1 | 9/2005 | Sgambati et al. | |
| 2006/0080238 A1 | 4/2006 | Nielsen et al. | |
| 2006/0089906 A1 | 4/2006 | Rowley | |
| 2006/0131390 A1 | 6/2006 | Kim | |
| 2006/0143122 A1 | 6/2006 | Sines et al. | |
| 2006/0143690 A1 | 6/2006 | Lin et al. | |
| 2006/0190300 A1 | 8/2006 | Drucker | |
| 2006/0230265 A1 | 10/2006 | Krishna | |
| 2006/0259311 A1* | 11/2006 | Stadler et al. | 705/1 |
| 2006/0294005 A1 | 12/2006 | Drepak | |
| 2007/0011093 A1 | 1/2007 | Tree | |
| 2007/0055628 A1* | 3/2007 | Blagg et al. | 705/39 |
| 2007/0136211 A1 | 6/2007 | Brown et al. | |
| 2007/0198432 A1 | 8/2007 | Pitroda et al. | |
| 2007/0214259 A1 | 9/2007 | Ahmed et al. | |
| 2007/0255662 A1 | 11/2007 | Tumminaro | |
| 2007/0260536 A1 | 11/2007 | Stone | |
| 2007/0276944 A1 | 11/2007 | Samovar et al. | |
| 2007/0291741 A1 | 12/2007 | Hwang | |
| 2008/0015985 A1 | 1/2008 | Abhari et al. | |
| 2008/0091600 A1 | 4/2008 | Egnatios et al. | |
| 2008/0091619 A1 | 4/2008 | Perlman et al. | |
| 2008/0110983 A1 | 5/2008 | Ashfield | |
| 2008/0162295 A1 | 7/2008 | Bedier | |
| 2008/0162349 A1* | 7/2008 | Pratt et al. | 705/44 |
| 2008/0177796 A1 | 7/2008 | Eldering | |
| 2008/0195510 A1* | 8/2008 | Olliphant | 705/30 |
| 2008/0201769 A1 | 8/2008 | Finn | |
| 2008/0208762 A1 | 8/2008 | Arthur et al. | |
| 2008/0228653 A1 | 9/2008 | Holdsworrth | |
| 2008/0288405 A1 | 11/2008 | John | |
| 2008/0289022 A1 | 11/2008 | Chiu | |
| 2008/0306877 A1 | 12/2008 | Mandeles et al. | |
| 2009/0006646 A1 | 1/2009 | Duarte | |
| 2009/0063345 A1 | 3/2009 | Erikson | |
| 2009/0094148 A1 | 4/2009 | Gilder et al. | |
| 2009/0112611 A1* | 4/2009 | Brown | 705/1 |
| 2009/0121016 A1 | 5/2009 | Hammad et al. | |
| 2009/0150265 A1 | 6/2009 | Keld | |
| 2009/0157531 A1 | 6/2009 | Bui | |
| 2009/0171778 A1 | 7/2009 | Powell | |
| 2009/0171844 A1 | 7/2009 | Olliphant et al. | |
| 2009/0173782 A1 | 7/2009 | Muscato | |
| 2009/0182674 A1 | 7/2009 | Patel et al. | |
| 2009/0182675 A1 | 7/2009 | Brody | |
| 2009/0210347 A1 | 8/2009 | Sarcanin | |
| 2009/0216676 A1 | 8/2009 | Mathur et al. | |
| 2009/0259547 A1 | 10/2009 | Clopp | |
| 2009/0287601 A1* | 11/2009 | Tumminaro et al. | 705/39 |
| 2010/0121745 A1* | 5/2010 | Teckchandani et al. | 705/30 |
| 2010/0153224 A1* | 6/2010 | Livnat | 705/21 |
| 2010/0318801 A1 | 12/2010 | Roberge et al. | |
| 2011/0060639 A1* | 3/2011 | Garcia | 705/14.35 |
| 2012/0078750 A1* | 3/2012 | Watkins | 705/26.41 |

OTHER PUBLICATIONS

Posting Payments, http://msdn.microsoft.com/en-us/library/aa480428(v=MSDN.10).aspx, 1998 (MSDN).

Apr. 2003 Report of the Auditor General of Canada, Apr. 2003 Report—Chapter 2 (Post Pay).

Young, Lee W., Jan. 6, 2011 International Search Report with Written Opinion from PCT Application No. PCT/US2010/054530 (9 pp.).

* cited by examiner

PEER-TO-PEER PAYMENT REQUEST

FROM: requester@server.com

TO:

AMOUNT: $

TIME LIMIT: days

PASSWORD:

SEND PAYMENT REQUEST

Fig. 8

PEER-TO-PEER AND GROUP FINANCIAL MANAGEMENT SYSTEMS AND METHODS

CROSS-REFERENCE TO RELATED APPLICATIONS

This is a continuation of U.S. application Ser. No. 12/778,459, filed May 12, 2010, which claims priority from U.S. Provisional Application No. 61/256,147, filed Oct. 29, 2009, all the above applications hereby incorporated by reference.

TECHNICAL FIELD

The present disclosure relates generally to computer-implemented systems and methods for peer-to-peer and group financial management.

BACKGROUND AND SUMMARY

Electronic commerce, commonly known as electronic marketing, e-commerce, or eCommerce, consists of the buying and selling of products or services over electronic systems such as the Internet and other computer networks. The amount of trade conducted electronically has grown extraordinarily with widespread Internet usage. Commerce conducted in this manner utilizes a complex web of innovations in electronic funds transfer, supply chain management, Internet marketing, online transaction processing, electronic data interchange (EDI), inventory management systems, automated data collection systems, and many others. Modern electronic commerce typically uses the World Wide Web at least at some point in the transaction's lifecycle, although it can encompass a wider range of technologies such as e-mail as well. It would be advantageous to utilize such electronic commerce systems to provide peer-to-peer and group financial management services.

Systems and methods for providing peer-to-peer and group financial management are provided herein. An example system includes a payment processor that executes software instructions for creating and managing electronic payment accounts and an accounts database to store account data from the payment processor. The payment processor may be configured to receive a payment request from a payer, the payment request including information to identify a payee and a payment amount. The payment processor may be further configured to determine if the accounts database includes an account associated with the payee, and based on a determination that the accounts database includes an account associated with the payee, send an electronic message to the payee that notifies the payee of the payment request. The payment processor may also be configured to access the accounts database to determine if the payee is identified as having a trusted relationship with the payer, and based on a determination that the payee is identified in the accounts database as having a trusted relationship with the payer, access the accounts database to transfer the payment amount from an account associated with the payer to the account associated with the payee without first receiving authorization for the transfer from the payee.

A method of transferring funds from a payer to a payee in a electronic payment system that includes a payment processor and an accounts database may include the following steps: receiving at the payment processor a payment request from the payer, the payment request including information to identify the payee and a payment amount; accessing an accounts database to determine if the accounts database includes an account associated with the payee; based on a determination that the accounts database includes an account associated with the payee, sending an electronic message from the payment processor to the payee that notifies the payee of the payment request; accessing the accounts database to determine if the payee is identified as having a trusted relationship with the payer; and based on a determination that the payee is identified in the accounts database as having a trusted relationship with the payer, the payment processor accessing the accounts database to transfer the payment amount from an account associated with the payer to the account associated with the payee without first receiving authorization for the transfer from the payee.

A financial management system may include a primary account, a sub-account associated with the primary account; and a payment processor for controlling payments made to and from the primary and sub-accounts. A plurality of users have access to the sub-account, and a single user has access to the primary account.

BRIEF DESCRIPTION OF THE DRAWINGS

For the present disclosure to be easily understood and readily practiced, the present disclosure will now be described, for purposes of illustration and not limitation, in conjunction with the following figures.

FIG. 4 depicts another example of a user interface that may be used to initiate a peer-to-peer payment request.

FIG. 5 depicts another example of a user interface that may be used to initiate a peer-to-peer payment request.

FIG. 8 depicts an example user interface that may be used to initiate a request for a peer-to-peer payment.

DETAILED DESCRIPTION

Figure 1:
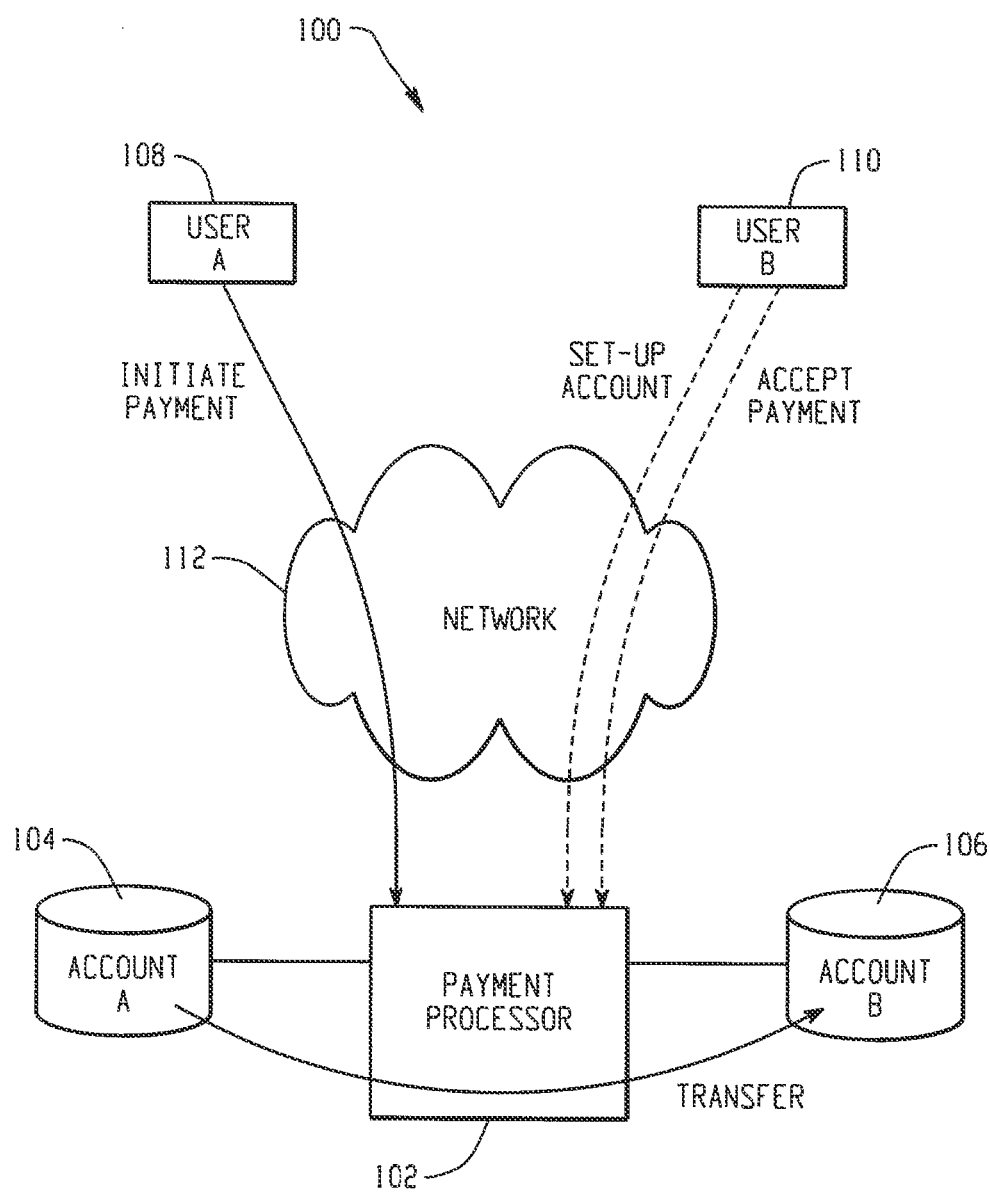
FIG. 1 is a diagram of an example peer-to-peer financial management system.

FIG. 1 is a diagram of an example peer-to-peer financial management system 100. The system includes a payment processor 102 that is used to manage a plurality of financial accounts 104, 106. The payment processor 102 may, for example, be used to implement a payment service, such as payclick by Visa™, in which a user 108, 110 may add funds to their respective the accounts 104, 106 in order to facilitate payments for electronic transactions. The users 108, 110 may communicate with the payment processor, for example over a computer network 112, to complete electronic transactions, to manage account funding sources (e.g., credit cards, debit cards, bank accounts, etc.), and/or to perform other financial or account management operations. An account, as used herein, may be a data structure stored in an accounts database that is accessible by the payment processor. The accounts database may, for example, be implemented using a single memory device or across multiple memory devices. In one example, the payment processor and the accounts database may be included within one or more network servers.

In the example illustrated in FIG. 1, the payment processor 102 is used to perform a peer-to-peer transfer of funds from User A 108 to User B 110. Specifically, User A 108 utilizes the payment processor 102 to make a payment for a specified amount to User B 110. To initiate the payment, User A communicates with the payment processor 102 over the computer network 112 to identify User B and to specify the amount to be paid. User B may be identified by providing a valid email address. The payment processor 102 may then send an email to User B over the computer network B that includes a notification that the payment has been initiated by User A. If User B already has an account 106, then he may accept the payment, for example by clicking on a link in the email. Once the payment is accepted, the specified funds are electronically transferred from account A 104 to account B. If User B does not have an account in the system, then the email notification may prompt User B to set up an account 106 with the payment processor 102 in order to receive payment. The specified funds may then be electronically transferred upon completion of the account registration by User B. Alternatively, User B could reject the requested payment, causing the funds to remain (or return to) account A 104.

Figure 2:
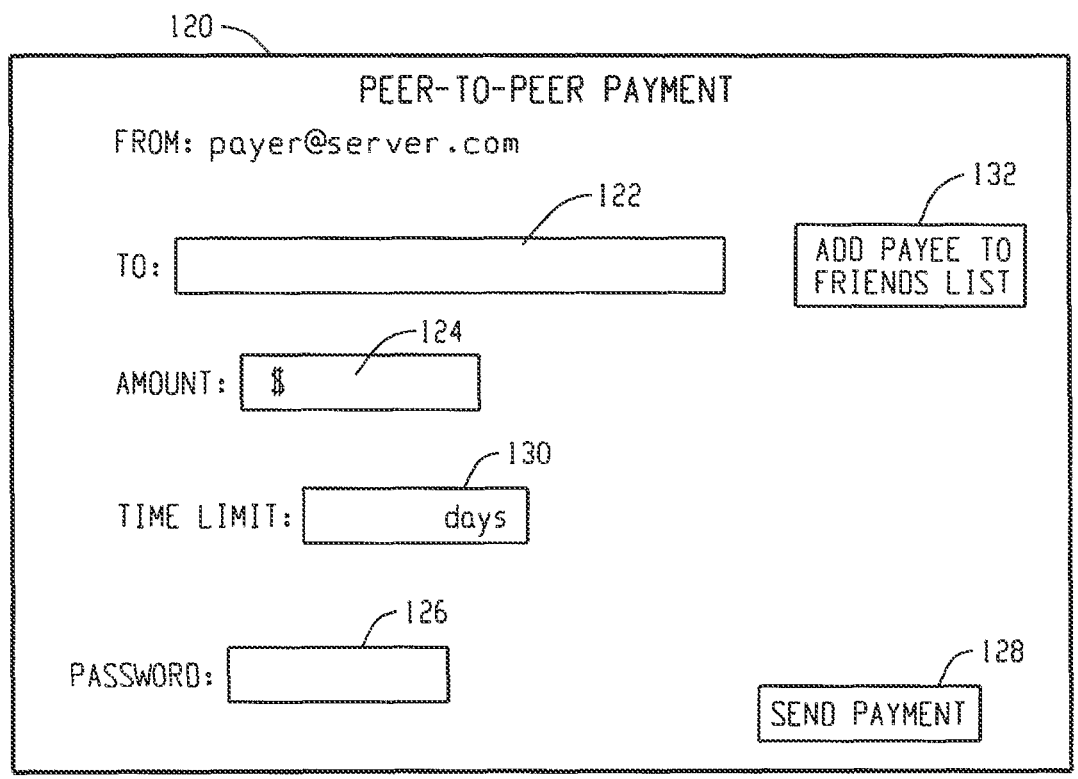
FIG. 2 depicts an example user interface that may be used to initiate a peer-to-peer payment request.

FIG. 2 depicts an example user interface 120 that may be used to initiate a peer-to-peer payment request. This user interface 120 may, for example, be provided to User A 108 by the payment processor 102 of FIG. 1 to initiate a payment to anyone with an email address. The user interface 120 includes a payee field 122 in which the user may enter the email address of a person to whom he wants to make a payment and an amount field 124 in which the user may enter the amount of the payment. When an email address is entered into the payee field 122, the system may validate the entry as a proper email format and check to see if the email address is associated with a current account. The system may also prompt the user to validate the amount entered into the amount field 124. Then, in order to initiate the payment request by sending an email notification to the identified payee, the user inputs his password to field 126 and selects a "Send Payment" input 128, such as a graphical button. At this time, funds are reserved for payment until such time as they are accepted, rejected, or a defined time limit is reached.

The example user interface 120 illustrated in FIG. 2 also includes a time limit field 130 that may be used to set a maximum number of days for which a pending payment will be valid. The time limit may, for example, be selected from a drop-down menu, and may be used to configure a maximum number of days up to a predetermined limit (e.g., 120 days.) The system configured maximum number of days may, for example, be the default setting for the time limit field 130.

In addition, the user interface 120 may also include an "Add Payee to Friends List" input 132, such as a graphical button, that enables the user to add the email address from the payee field 122 to a friends (or trusted payee) list. In one example, when payments are made to a person in the friends list, the payment may be made to the payee's account without it first being accepted by the payee. This may be limited to entries in the friends list that have been validated. For example, when the user enters a payee into his friends list, for example by pressing the user interface input 128, an email may be sent to the payee inviting them to become a "linked" friend. The payee may then respond by accepting or denying the invitation. The payee may then only appear in the friends list after having accepted the invitation. Any subsequent payment between linked friends may then be made instantly, with the receiving party receiving an email notification that payment has been made to his account.

Figure 3:
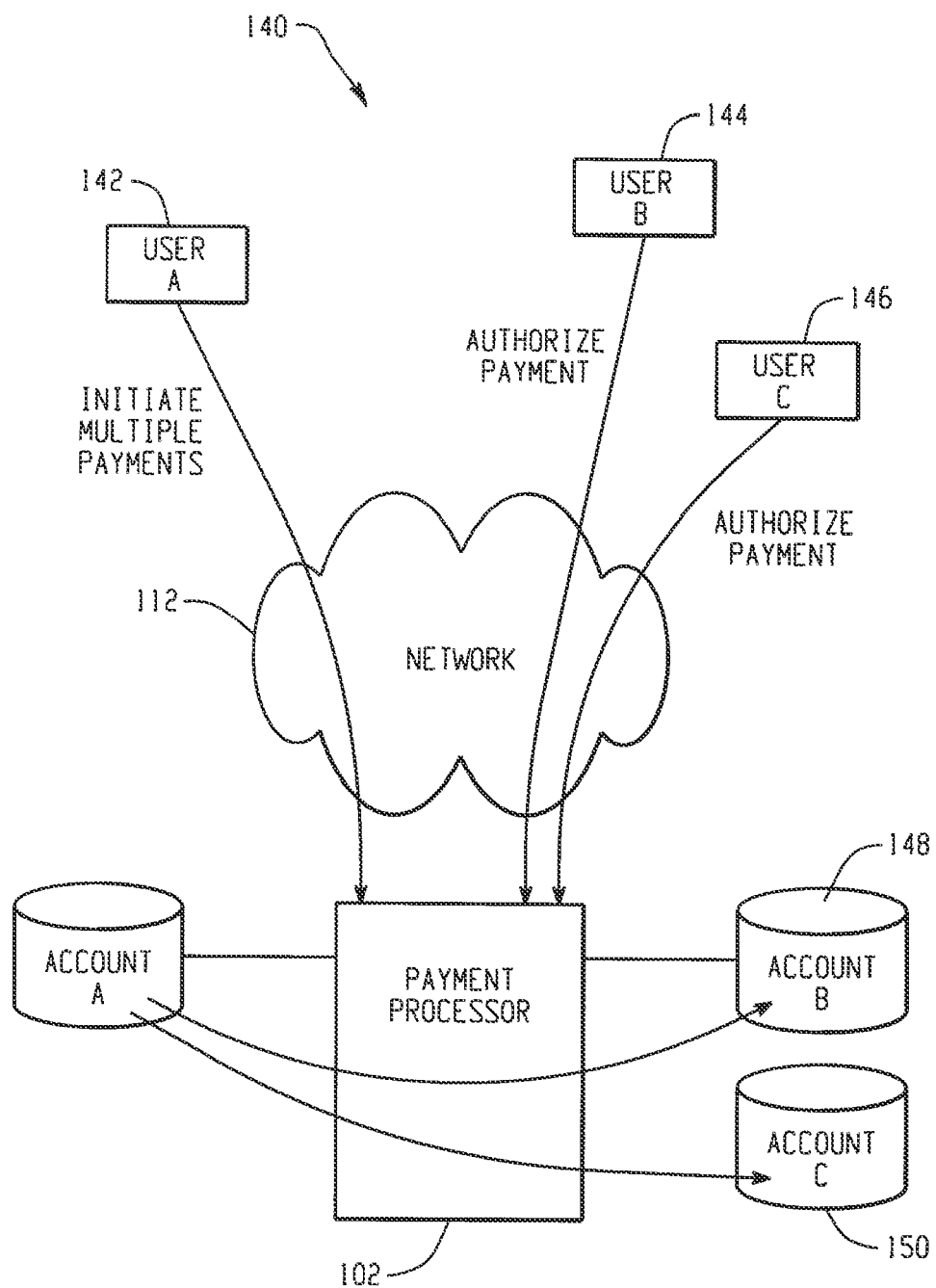
FIG. 3 is a diagram of another example in which the peer-to-peer financial management system is used to initiate payment to multiple payees in a single request.

FIG. 3 is a diagram of another example in which the peer-to-peer financial management system 140 is used to initiate payment to multiple payees in a single request. In this example, User A 142 accesses the payment processor 102 to simultaneously initiate a payment to both User B 144 and User C 146. To initiate the payment, User A 142 communicates with the payment processor 102 over the computer network 112 to identify the payees 144, 146 and to specify the amount to be paid to each. The payees 144, 146 may, for example, be identified by providing the payment processor 102 with valid email addresses. The payment processor 102 may then send emails to the identified payees 144, 146 over the computer network 112 that include notifications that payment has been initiated by User A. Similar to the single payee example described above with reference to FIG. 1, the payees 144, 146 in this example may have already-existing accounts 148, 150 or may set up new account in response to the payment notification. Once payment is authorized by a payee, the identified funds are transferred to their respective accounts 148, 150 by the payment processor 102. If the payee 144, 146 has an existing account, then payment may be authorized in response to the payment notification email, for example by selecting a link within the email. Alternatively, if the payee 144, 146 does not have an existing account, then payment may be authorized by successfully registering a new account with the payment processor 102.

Figures 4, 5:
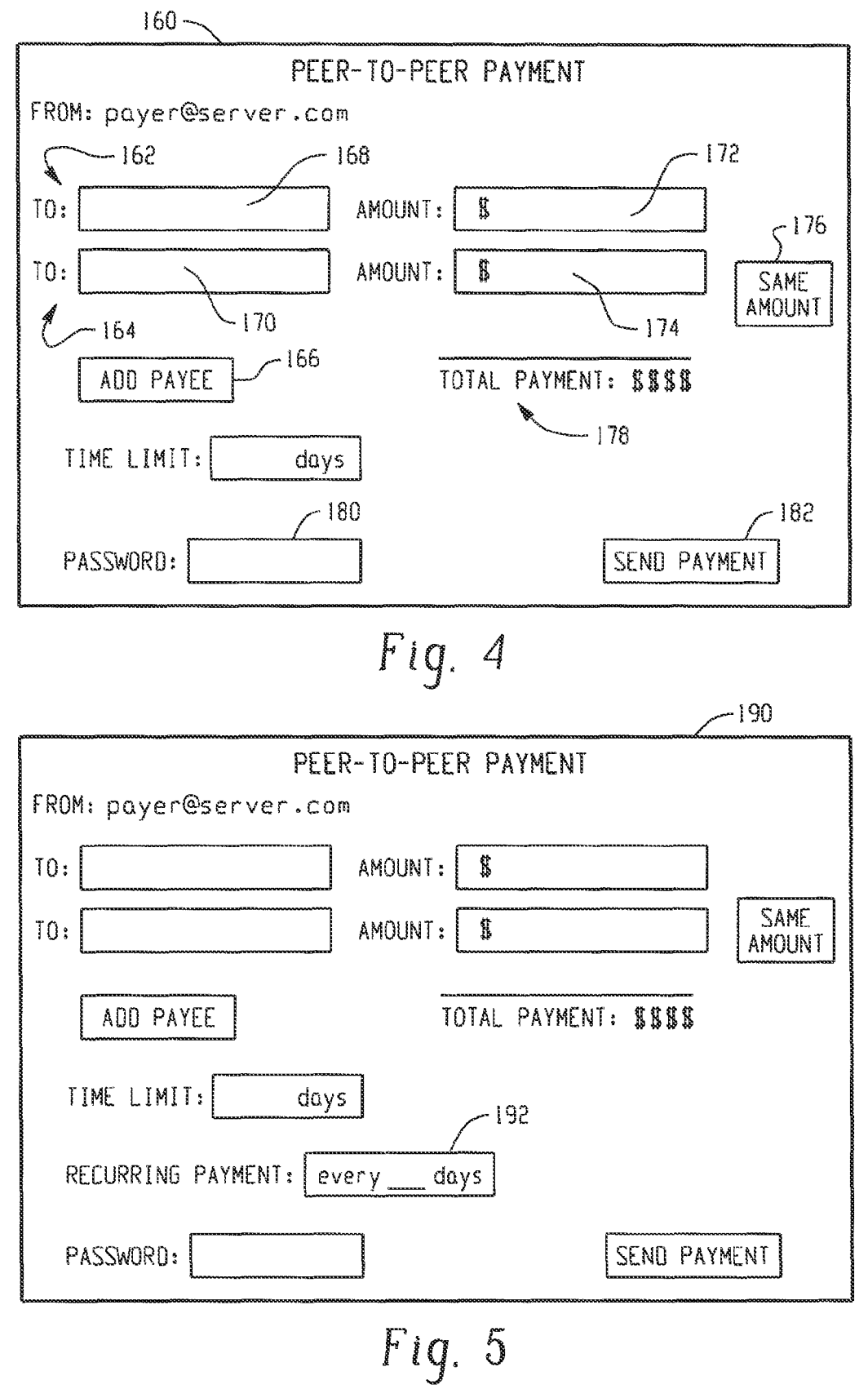

FIG. 4 depicts another example of a user interface 160 that may be used to initiate a peer-to-peer payment request. In this example, the user interface 160 is used to initiate a simultaneous payment to multiple payees, as illustrated in FIG. 3. Additional payee rows 162, 164 are added to the interface 160 by selecting an "Add Payee" input 166. Each payee row 162, 164 includes a payee field 168, 170 and an amount field 172, 174. When an email address is entered into the payee fields 162, 170, the system may validate the entry as having a proper email format and may also determine if the email address is associated with a current account. The system may also prompt the user to validate the amount entered into the amount fields 172, 174.

The amount fields 172, 174 may be populated by either (a) entering a single amount in the first payee row 162 and selecting a "same amount" input which automatically populates the amount field 174 in any remaining rows 164, or (b) entering a specific amount in each payee row which may or may not be the same as the amount in any other row. A total payment amount 178 may also be displayed to tabulate the total of all payments in the payee rows 162, 164. The total payment amount 178 may also be used by the payment processor 102 to compare the requested total payment 178 with the available balance in the payer's account. The system may, for example, provide an in-line notification if the total payment 178 exceeds the balance in the payer's account.

The value of a single payment (e.g., as shown in FIG. 2) or the total value of multiple payments 178 may trigger different interface options depending on the current balance in the payer's account. For instance, if the total amount of payment is less than the current balance in the payer's account, then the payment may be initiated by sending email notifications to the identified payees upon successful entry of a password 180 and selection of the "send payment" input 182. In one example, the payment processor 102 may enable an account holder to authorize an automatic, recurring deposit to his account. If the total payment amount is more than the current balance in the payer's account and such a recurring deposit has been authorized, then the payment processor 102 may first process the recurring deposit and then process the requested payment (after successful entry of the password 180). In addition, if the total payment amount is more than the payer's current balance and no recurring deposit is authorized, then the payment processor 102 may prompt the payer to add funds to his account or to eliminate or reduce amounts 172, 174 from the requested payment.

FIG. 5 depicts another example of a user interface 190 that may be used to initiate a peer-to-peer payment request. In this example, the user interface also includes a recurring payment field 192. The recurring payment field 192 enables the payer to select a specific interval at which to repeat the single or multiple payment. For example, a recurring payment 192 may be set to automatically make a payment that is due every month. When a recurring payment is selected, the payment processor 102 may, for example, allow the payer to select an option to automatically add any needed funds to his account should the balance be insufficient to complete the recurring payment.

Figure 6:
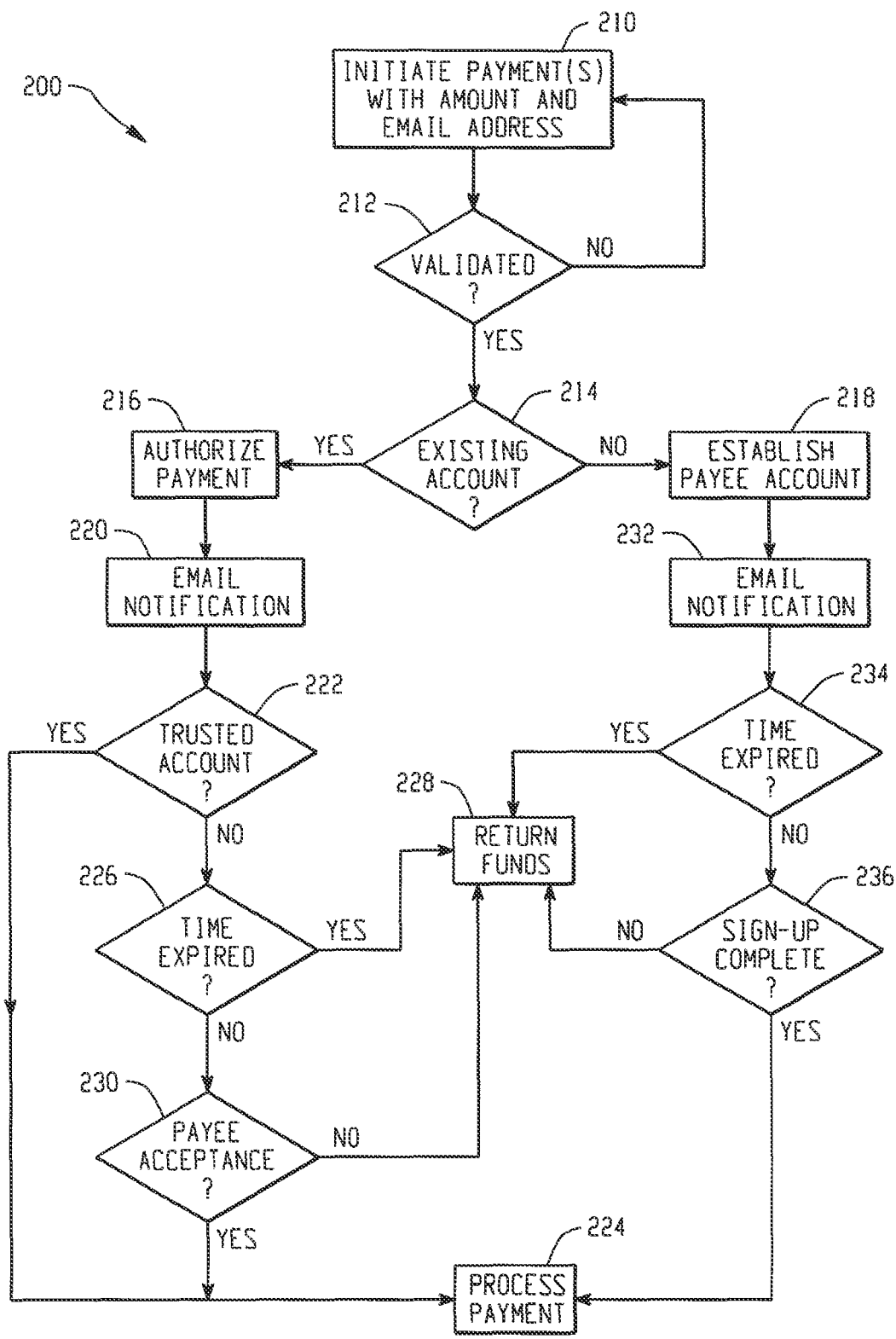
FIG. 6 is a flow diagram of an example method for performing an electronic peer-to-peer financial transaction.

FIG. 6 is a flow diagram 200 of an example method for performing an electronic peer-to-peer financial transaction. The electronic payment is initiated at step 210 by identifying the payee and the amount to be transferred from the payer's account to the payee's account. The payee may, for example, be identified by providing a valid email address. It should be understood, that either a single or multiple payees may be identified in step 210. In step 212, the email address for the payee and the amount designated for transfer are validated. For instance, the method may validate that the email has been entered using a proper email format and may prompt the user to verify the entered payment amount. If the validation is not successful, then the method returns to step 210. Otherwise the method proceeds to step 214 to determine if the payee email address corresponds to an existing account. If it does, then the method proceeds to step 216. Otherwise, if there is no existing account corresponding to the payee email address, then the method proceeds to step 218.

If the payee has an existing account, the payment is initiated at step 216 and an email notification is sent to the payee at step 220. At step 222, the method determines if the payee is included in a trusted accounts list (e.g., the payer's friends list). If the payee has a trusted account, then the payment may be made automatically, without requiring acceptance, and the method proceeds directly to step 224 to process the payment and transfer the funds. Otherwise, if the payee does not have a trusted account, then the method proceeds to step 226.

During the payment initiation step 210, the payer may also identify a time limit for which the pending payment will be valid. Otherwise, a default time limit may be used. In either case, the time limit for completing the payment is tracked at step 226. If the payment is not completed before expiration of the time limit, then the method proceeds to step 228 and the funds are returned to (or remain in) the payer's account. Otherwise, the method proceeds to step 230 where the method waits for the payee to accept or reject the payment. Payment may be accepted or rejected, for example, by the payee selecting an appropriate link provided in the email notification. In another example, the payee may accept or reject payment by logging into his account and selecting an option to accept or reject the pending payment. If payment is accepted, then the method proceeds to step 224 to process the payment and transfer the funds. If payment is rejected, then the method proceeds to step 228 and the funds are returned to (or remain in) the payer's account.

If the payee does not have an existing account, then the method establishes an account for the payee at step 218 and sends an email notification to the payee of the requested payment at step 232. At step 234, the method tracks the time limit for completing the transaction. If time expires before the payment is processed, then the method proceeds to step 228 and the funds are returned to (or remain in) the payer's account. Payment may be accepted by the payee at step 236 by completing a registration process for the new account. For instance, the email notification may provide the payee with an Internet address for logging into the system and signing up for the account. If the account sign-up is completed by the payee, then the payment is accepted and the method proceeds to step 224 to process the payment and transfer the funds. Otherwise, if the payee declines to sign-up for an account or otherwise refuses the payment, then the funds are returned to (or remain in) the payer's account at step 228.

Figure 7:
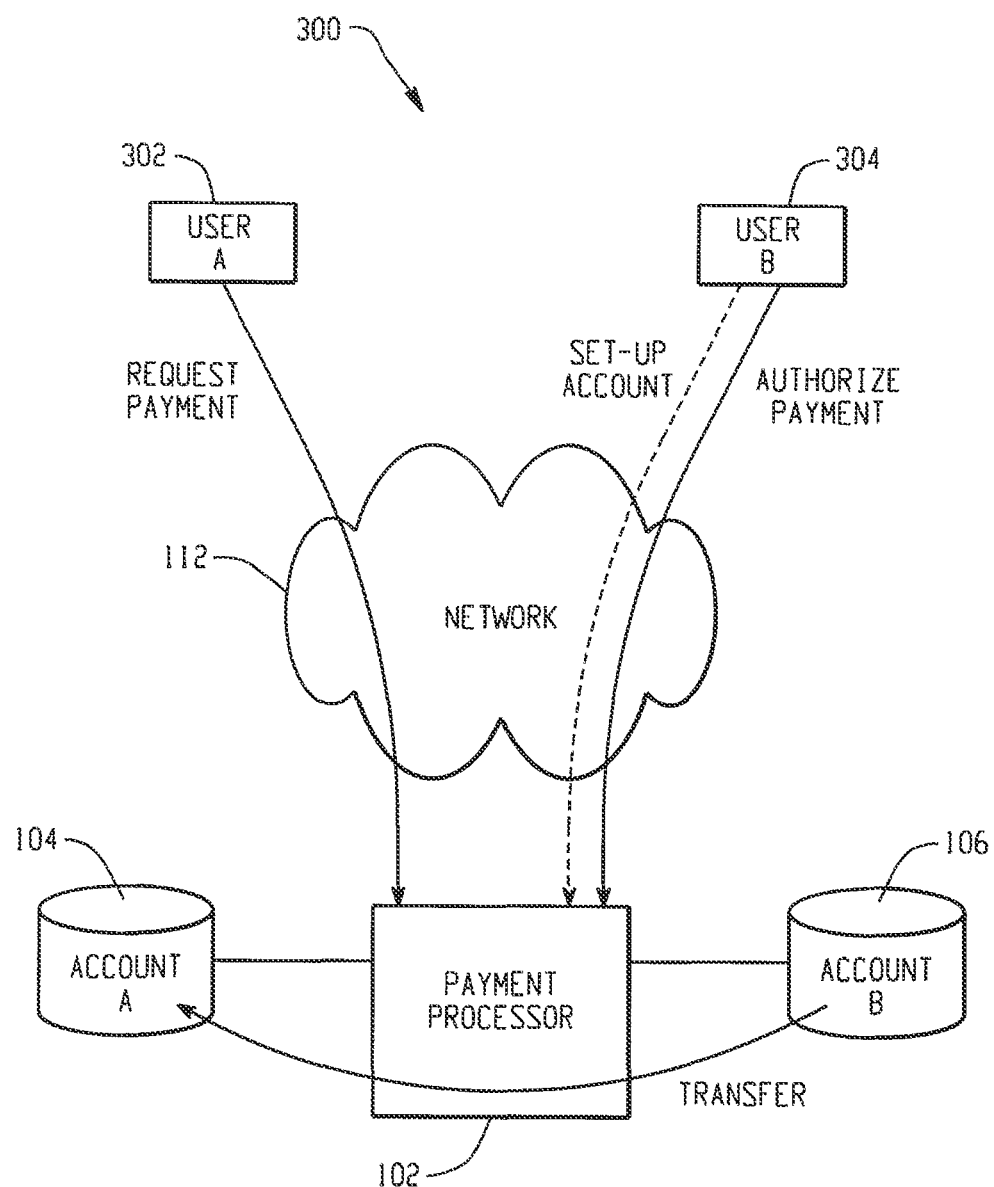
FIG. 7 illustrates an example in which a peer-to-peer financial management system is used to request a payment.

FIG. 7 is an example in which the peer-to-peer financial management system 300 is used to request a payment. In this example, User A 302 accesses the payment processor 102 to request a payment from User B 304, who may or may not have an existing account 106. To request the payment, User A 302 communicates with the payment processor 102 over the computer network 112 to identify the payer 304 and to specify the requested amount to be paid. The prospective payer 304 may, for example, be identified by providing the payment processor 102 with a valid email address. The payment processor 102 may then send an email to User B 304 over the computer network 112 that includes a request for payment of the identified amount. If User B has an existing account 106, then he may authorize or deny the payment, for example by clicking on a link in the email. Alternatively, User B 304 could authorize or deny payment by logging into his account with the payment processor 102 and selecting an option to authorize the requested transaction. If User B 304 does not have an existing account, then the email notification may prompt User B to set up an account 106 with the payment processor 102. The requested funds may then be electronically transferred upon completion of the account registration and necessary account funding by User B 304.

FIG. 8 depicts an example user interface 310 that may be used to initiate a request for a peer-to-peer payment. This user interface 310 may, for example, be provided to User A 302 by the payment processor 102 of FIG. 7 to initiate the payment request from User B 304. The user interface 310 includes a payer field 312 in which the user may enter the email address of the person from whom the payment is requested and an amount field 314 in which the user may enter the amount of the requested payment. When an email address is entered into the payer field 312, the system may validate the entry as a proper email format and check to see if the email address is associated with an existing account. The system may also prompt the user to verify the amount entered into the amount field 314. Then, in order to initiate the payment request by sending an email notification to the prospective payer, the user inputs his password to field 316 and selects the "send payment request" input 318.

The example user interface 310 illustrated in FIG. 8 also includes a time limit field 320 that may be used to set a maximum number of days for which the pending transaction will be valid. The time limit may, for example, be selected from a drop-down menu, and may be used to configure a maximum number of days up to a predetermined limit. A default setting for the time limit field 320 may also be provided by the system. In one example, the predetermined maximum time limit that may be entered into the time limit field 320 may correspond with the default time limit set by the system.

Figure 9:
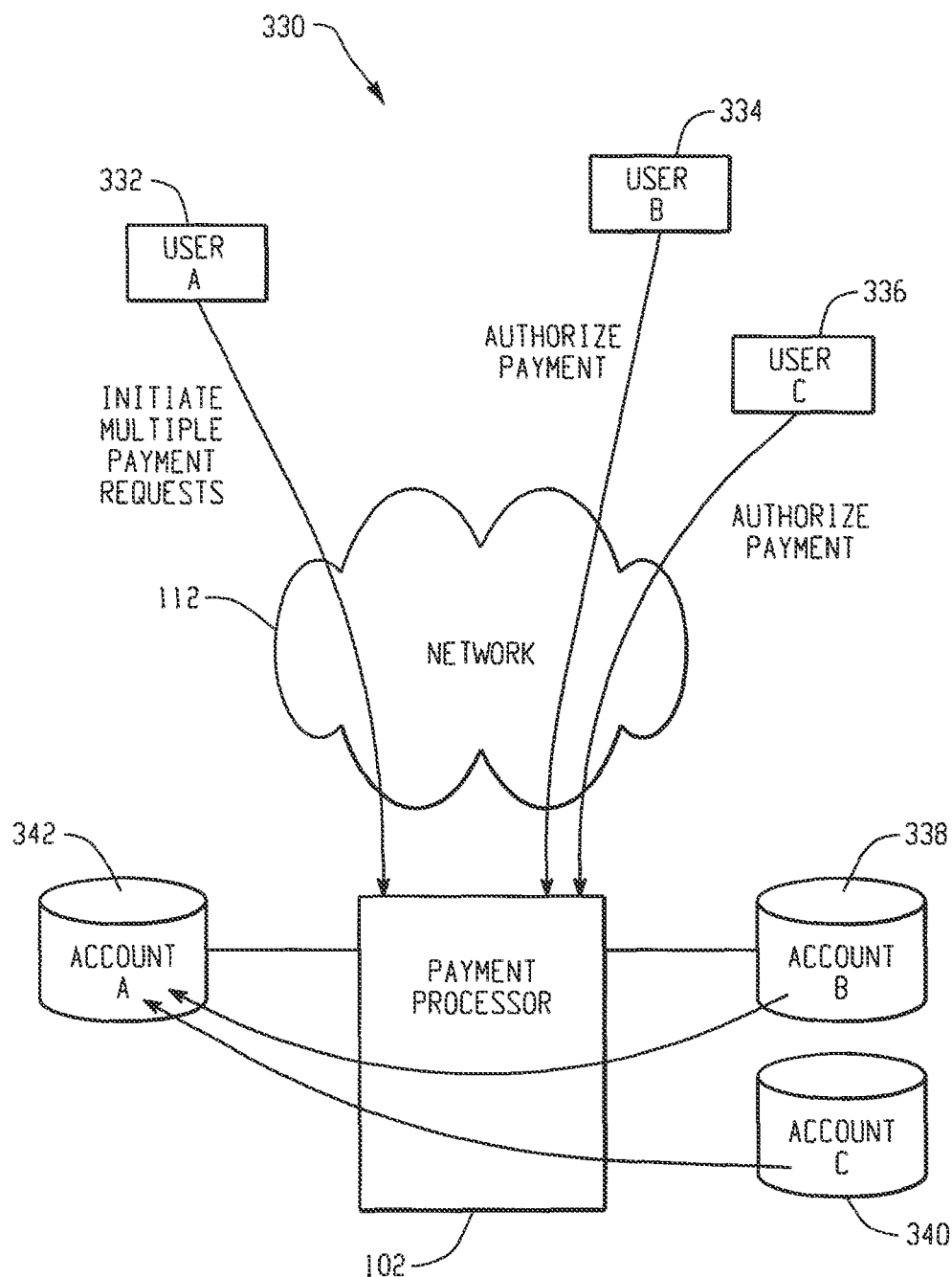
FIG. 9 is a diagram of another example in which the peer-to-peer financial management system is used to request payment from multiple prospective payers in a single request.

FIG. 9 is a diagram of another example in which the peer-to-peer financial management system 330 is used to request payment from multiple prospective payers in a single request. In this example, User A 332 accesses the payment processor 102 to simultaneously initiate a request for payment to both User B 334 and User C 336. To initiate the payment request, User A 332 communicates with the payment processor 102 over the computer network 112 to identify the prospective payers 334, 336 and to specify the amount requested from each. The payers 334, 336 may, for example, be identified by providing the payment processor 102 with valid email addresses. The payment processor 102 may then send emails to the prospective payers 334, 336 over the computer network 112 that include notifications of the requested payment initiated by User A 332. Similar to the single payer example described above with reference to FIG. 7, the payers 334, 336 in this example may have existing accounts 338, 340 or may set up new accounts in response to the payment request. If payment is authorized by a payer, the identified funds are transferred from the payer account 338 or 340 to User A's account 342. If the payer 334, 336 has an existing account, then payment may be authorized or denied in response to the email notification, for example by selecting an appropriate link within the email. Alternatively, if the payer 334, 336 does not have an existing account, then payment may be authorized by successfully registering a new account with the payment processor 102 and adding the necessary funds to the account.

Figure 10:
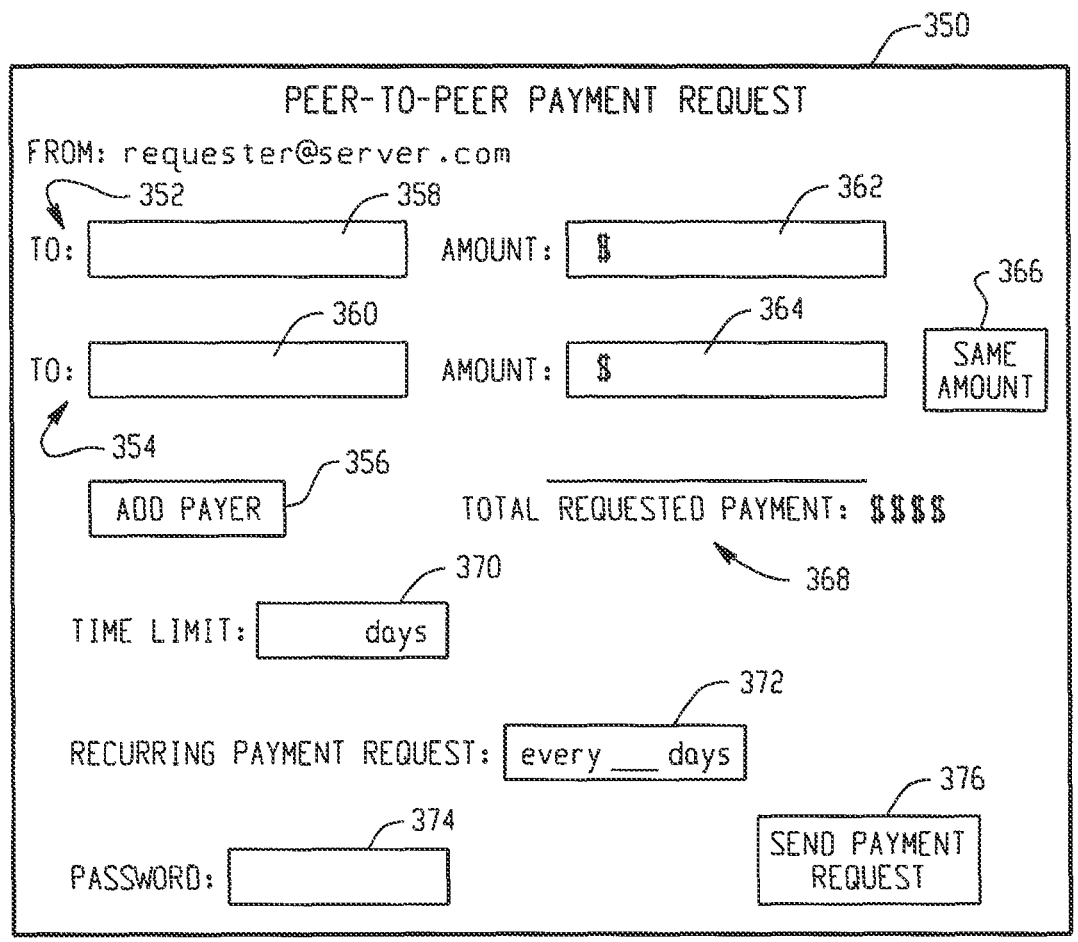
FIG. 10 depicts another example of a user interface that may be used to initiate a peer-to-peer request for payment.

FIG. 10 depicts another example of a user interface 350 that may be used to initiate a peer-to-peer request for payment. In this example, the user interface 350 is used to initiate a simultaneous payment request from multiple prospective payers, as illustrated in FIG. 9. Additional payer rows 352, 354 are added to the interface by selecting an "Add Payer" input 356. Each payer row 352, 354 includes a payer field 358, 360 and an amount field 362, 364. When an email address is entered into the payer fields 358, 360, the system may verify that the entry is in a proper email format and determine if the email address is associated with a current account. The system may also prompt the user to verify the amount(s) entered into the amount fields 362, 364.

The amount fields 362, 364 may be populated be either (a) entering a single amount in the first payer row 352 and selecting the "same amount" input 366, or (b) entering a specific amount into each payer row 352, 354 which may or may not be the same as the amount in any other row. A total payment amount 368 may also be displayed to tabulate the total of all requested payments in the payer rows 352, 354. In another example, the user interface may enable the user to enter a "goal amount" and then the total payments requested may be validated to match the goal amount.

The user interface 350 in this example also includes a time limit field 370 to set a maximum time limit for the transaction and a recurring payment field 372. The recurring payment field 372 enables the user to select a specific interval at which to repeat the single or multiple payment request. For example, a recurring payment 372 may be set to automatically make a payment request each month and/or generate documentation related to the payment, such as a tax invoice.

Once the appropriate fields in the user interface have been completed, the user may send the payment requests by entering his password into the password field 374 and selecting the "Send Payment Request" input 376.

Figure 11:
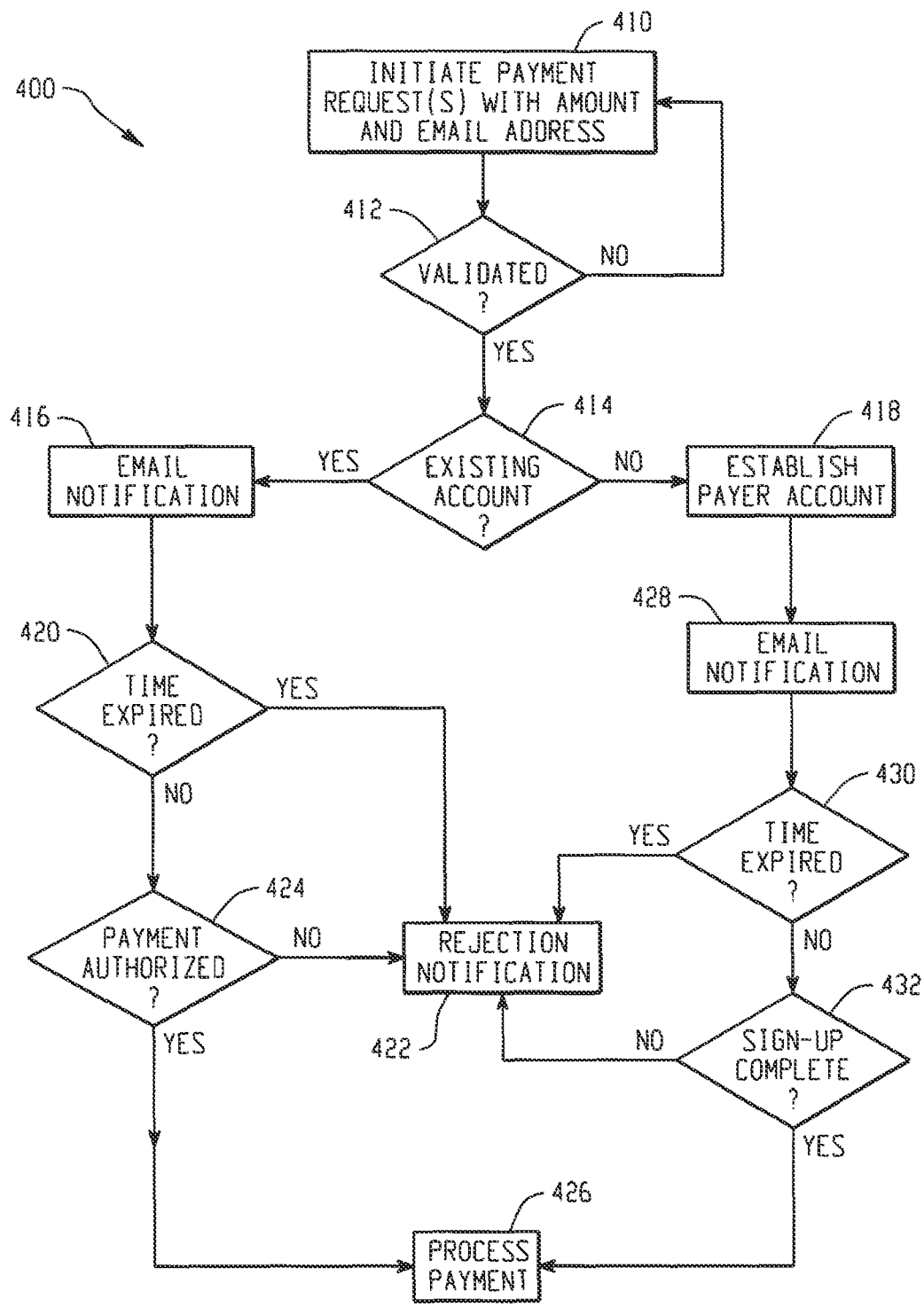
FIG. 11 is a flow diagram of an example method for performing an electronic peer-to-peer financial transaction in which a payment is requested.

FIG. 11 is a flow diagram 400 of an example method for performing an electronic peer-to-peer financial transaction in which a payment is requested. The payment request is initiated at step 410 by identifying the prospective payer and the amount of the payment request. The prospective payer may, for example, be identified by providing a valid email address. It should be understood, that either a single or multiple payers may be identified in step 410. In step 412, the email address for the payer and the amount of the requested payment are validated. For instance, the method may validate that the email has been entered using a proper email format and may prompt the user to verify the entered payment amount. If the validation is not successful, then the method returns to step 410. Otherwise the method proceeds to step 414 to determine if the payer email address corresponds to an existing account. If it does, then the method proceeds to step 416. Otherwise, if there is no existing account corresponding to the payer email address, then the method proceeds to step 418.

If the prospective payer has an existing account, an email notification requesting the payment is sent to the payer at step 416. During the payment request initiation step 410, the user may also identify a time limit for which the requested payment will be valid. Otherwise, a default time limit may be used. In either case, the time limit for completing the payment is tracked at step 420. If the payment is not completed before expiration of the time limit, then the method proceeds to step 422 and a rejection notification is sent to the user. Otherwise, the method proceeds to step 424 where the method waits for the prospective payer to accept or reject the requested payment. Payment may be accepted or rejected, for example, by the payer selecting an appropriate link provided in the email notification. In another example, the payer may accept or reject payment by logging into his account and selecting an option to accept or reject the requested payment. In addition, the payment authorization step 424 may also enable the prospective payer to add any necessary funds to his or her account to complete the transaction. If payment is accepted, then the method proceeds to step 426 to process the payment and transfer the funds. If payment is rejected, then the method proceeds to step 422 and a rejection notification is sent to the requester.

If the prospective payer does not have an existing account, then the method establishes an account for the payer at step 418 and sends an email notification to the payer of the requested payment at step 428. At step 430, the method tracks the time limit for completing the transaction. If time expires before the payment is processed, then the method proceeds to step 422 and a rejection notification is sent to the requester. Payment may be authorized by the payer at step 432 by completing a registration process for the new account and adding the necessary funds to complete the transaction. For instance, the email notification may provide the payer with an Internet address for logging into the system and signing up for the account. If the account sign-up and necessary account funding is completed by the payer, then the payment is authorized and the method proceeds to step 426 to process the payment and transfer the funds. Otherwise, if the prospective payer declines to sign-up for an account or otherwise refuses the payment, then a rejection notification is sent to the requester at step 422.

Figure 12:
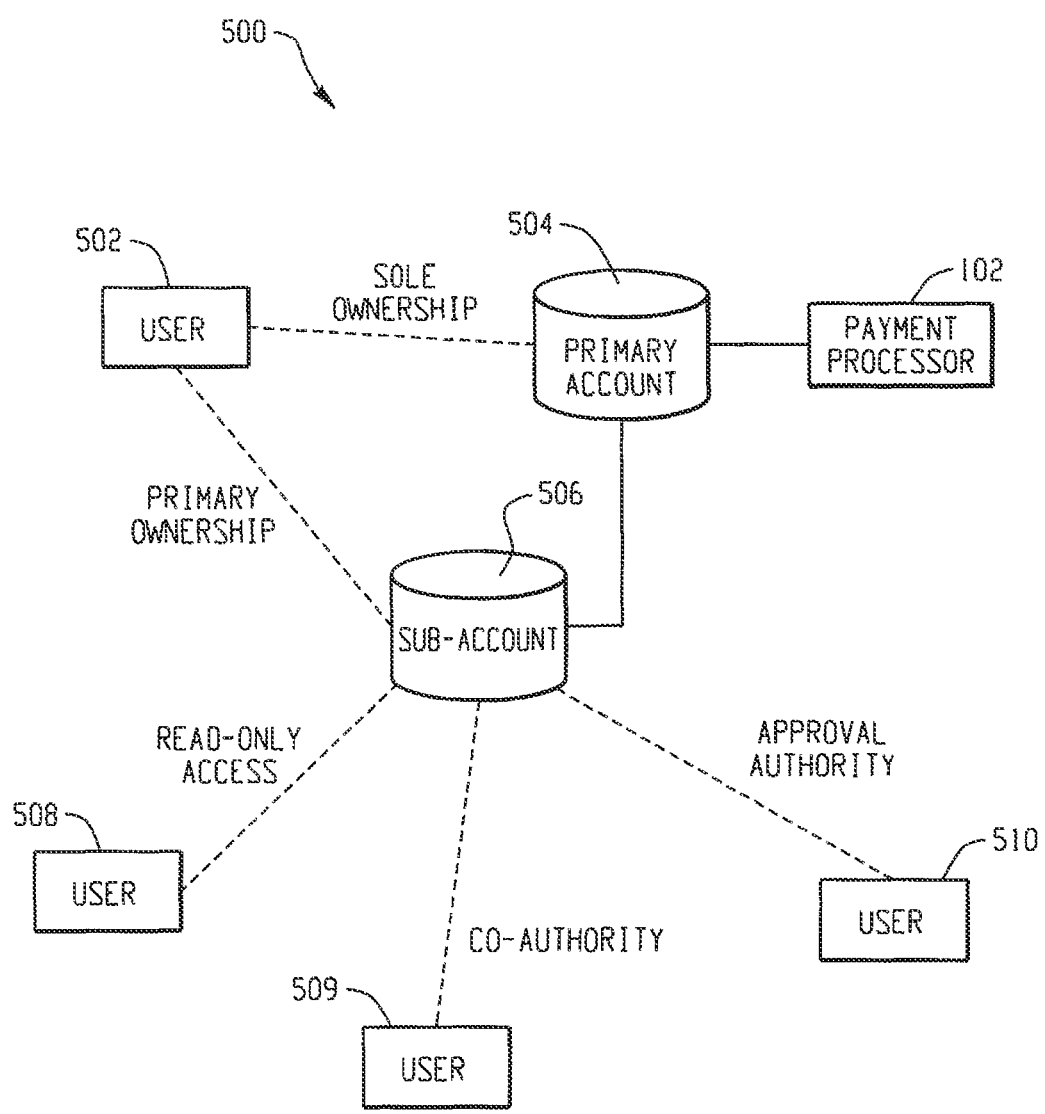
FIG. 12 is a diagram that depicts an example group account in a financial management system.

FIG. 12 is a diagram that depicts an example group account in a financial management system 500. As illustrated, the payment processor 102 may enable a user 502 to have both a primary account 504 and one or more sub-accounts 506. The accounts may be set up such that the user 502 has sole ownership of the primary account 504 and primary ownership, control and responsibility for the sub-account 506. Other users 508-510 may then be invited by the primary owner 502 to share access to a sub-account 506. It should be noted that certain tax regulations, AML/CTL and other regulations may control how ownership of a sub-account may be shared.

The invited users 508-510 may be given different levels of sub-account access by the primary user 502. For instance, a user 508 may be provided read-only access of the sub-account 506 so that he or she is able to see the account status and any recent activity. Another user 509 may be given co-authority for the sub-account 506 to perform specific actions, such as the ability to request payments to the sub-account from others. Another user 510 may be given approval authority for the sub-account 506. Approval authority may, for example, enable the user 510 to set specific tasks which require one or more members of the account to approve actions before they are taken. For instance, before an outbound payment requested by a user 510 with approval authority is made, one or more other members must approve the payment, preferably using their security password, before payment is processed.

The payment processor 102 may also be able to configure and require a single or recurring membership fees from one or more members of a sub-account 506. In another example, the payment processor 102 may be configured to pay out a single or recurring dividend from the sub-account to one or more of its members. The payment processor 102 may also be configured to, by default, send the primary account owner 502 an email and account notification when any payments are made (or fail) from the sub-account 506. The primary account owner 502 may also be able to select other members 508-510 to receive such notifications. The members 508-510 may be given the option to accept or reject such notifications before activated.

In one example, the payment processor 102 may establish an audit trail that records who has performed what actions with the sub-account. This option may, for example, be provided in an account user interface.

The payment processor 102 may also be configured to provide a communication process with one or more of the members 502, 508-510 of a group account 506. This may include the ability for members of the group account 506 to subscribe to receive periodic updates on the account status via email or some other means. It may also include the ability for account members to elect to receive email notifications of specific events on the account or to receive email prompts and reminders for actions which the member is responsible (e.g., a payment requested from the member or an authorization that the member needs to provide for a pending payment.)

The payment processor 102 may also be used to set up specific financial goals for a group account 506. For instance, a specific group savings or financial goal may be configured in connection with the account 506 so that all inbound payments are contributed towards the goal. The payment processor 102 may communicate the status of the goal, for instance by providing a visual status indicator in a user interface. In addition, the expenditure of the achieved goal amount may either (1) require one or multiple authorities before it can be executed, or (2) may be initially set-up to be pre-authorized and automated to automatically process the goal transaction (e.g., when the goal is met).

Figure 13:
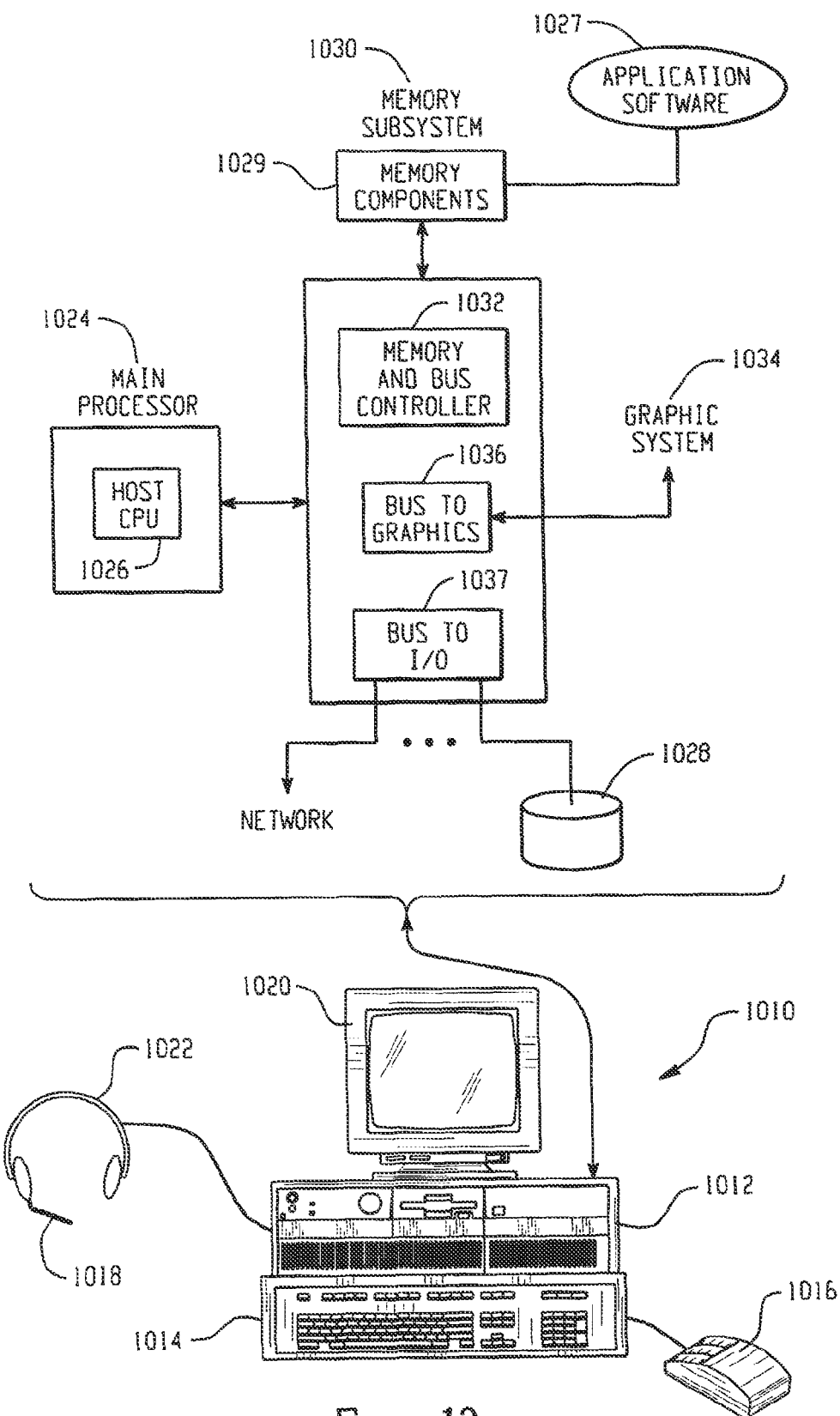
FIG. 13 is a block diagram of hardware which may be used to implement the various embodiment described herein.

FIG. 13 is a block diagram of hardware 1010 which may be used to implement the various embodiments of the method of the present invention, such as the payment processor described above. The hardware 1010 may be a personal computer system or server system that includes a computer 1012 having as input devices keyboard 1014, mouse 1016, and microphone 1018. Output devices such as a monitor 1020 and speakers 1022 may also be provided. The reader will recognize that other types of input and output devices may be provided and that the present invention is not limited by the particular hardware configuration.

Residing within computer 1012 is a main processor 1024 which is comprised of a host central processing unit 1026 (CPU). Software applications 1027, such as the method of the present invention, may be loaded from, for example, disk 1028 (or other device), into main memory 1029 from which the software application 1027 may be run on the host CPU 1026. The main processor 1024 operates in conjunction with a memory subsystem 1030. The memory subsystem 1030 is comprised of the main memory 1029, which may be comprised of a number of memory components, and a memory and bus controller 1032 which operates to control access to the main memory 1029. The main memory 1029 and controller 1032 may be in communication with a graphics system 1034 through a bus 1036. Other buses may exist, such as a PCI bus 1037, which interfaces to I/O devices or storage devices, such as disk 1028 or a CDROM, or to provide network access.

Following are several non-limiting examples of how the financial management systems and methods described above with reference to FIGS. 1-13 may be utilized. In certain examples, the financial management systems and methods may be used for group social savings. For instance, in the case of a one time event, a group may contribute towards the cost of the event. For instance, in the example of a milestone party (e.g., a $21^{st}$ birthday) where a deposit needs to be made in advance, the group may use a group account, invitation to join the group, a request for payment from members of the group, an expenditure of money to make the required deposit(s) and other payments with possible need for multiple user's authorization before the payments are made. In another example, a group trip that requires a group deposit or fee may utilize a group account, an invitation to join the group, a request for payment from members of the group, an expenditure of money to make required deposit(s) and other payments with the possible need for multiple user's authorization before these payments are made.

In another example, a group social saving account may be utilized for an ongoing activity in which a group contributes to a pool of funds for application to the ongoing activities of the group. For instance, a club with membership activities may use a group account, an invitation to join the group, a request for a recurring payment from members of the group, an automated expenditure of money to pay the regular fees due from the group and other payments with the possible need for multiple user's authorization before these payments are made.

In other examples, the financial management systems and methods may be utilized for charity fund raising. For instance, the systems and methods may be used for recurring charity donations, for instance to enable a charitable organization to invite account holders to become "friends" of the charity and then set up recurring donations to the charity's account. In another example, a charity event may be managed using the financial management systems and methods. An example process flow for this may be as follows:

i. the charity creates a system account for a specific fund raising event and sets up a profile for the specific charity event (e.g., to provide overview information and explain how sponsorship works);

ii. the charity invites people to join the fundraising drive, e.g., if the people invited by email already have an existing system account, then they would set up the charity as a "friend", or if they do not have an existing account they would receive an email prompt to create an account; if they enroll in the charity drive via the charity website or other online asset instead of an email invitation, then they may link through to account registration as part of an online process on the charity site;

iii. the user joins a charity sub-account, which would actually be a sub-account for the account of the charitable organization (not the user's account);

iv. from this sub-account, the user sends sponsorship invitations out to friends by entering their email addresses;

v. invitees receive an email request to sponsor the initial user (if they have an account already they go straight to the interface in the next step, if not they create an account first);

vi. invitees see the charity interface which tells them who invited them to sponsor, what the charity event is about and how it works, and then prompts the invitee to:

a. enter an amount to sponsor the user per unit completed, or b. enter a set amount to sponsor the user, and c. agree to terms and conditions and authorize the sponsorship pledge with the entry of their security password;

vii. when the user completes the event, he or she goes on to a user interface and enters the total units completed, and then collects on an input to "collect sponsorship donations", which are processed automatically and immediately;

viii. if any sponsor does not have sufficient funds in their account of the donation and no automatic funding has been authorized, then the donation may come straight from a default funding source instead (e.g. as agreed to in the terms and conditions of the sponsorship); if they have no default funding source configured, then the sponsor may receive an email prompting them to complete the donation payment;

ix. all sponsors may receive an email informing them that the event has been completed, how the user did in the event and confirming that the donation transaction has been completed, with all necessary details to use the email as a tax receipt.

In other examples, the financial management systems and methods may be utilized for group financial management. For instance, a group account used to achieve the financial goal may be to pay a group bill, e.g., rent, electricity, a phone bill for a shared house, etc. This may be achieved by sending out invitations to join the group account, requesting a one time or recurring payment from the members of the group, and providing for the automated expenditure of money to pay the regular bills due from the group with the possible need for multiple user's authorization before some payments are made. Integration with a bill payment portal may also be available to allow the bill to come into the account when issued, be viewable by all participants in the group, and be automatically paid when all participants have contributed their share. Advanced functions may allow line-item allocation from the bill dependent on the format of delivery of the bill by the issuer. An example process flow for this is as follows:

i. account owner associates specific billers with their group account (assumes integration with a bill payment portal/service);

ii. paperless bills are delivered directly to the account;

iii. account owner allocates total amount to each bill to members of the group, requesting payment from each for their share;

iv. when all individuals have paid, the bill is automatically paid from the group account;

v. for bills that are of the same amount each month, the above could be set up to be automatically recurring;

vi. in an advanced scenario, bills could be delivered itemized and individual items could be allocated to individual group members to automatically generate the total due from each after all items are allocated;

vii. in a scenario where there is no integration with a bill payment portal/service or where the biller does not participate in the service, the account owner may create the bill by entering the bill name and amount, and then proceed with allocation to members of the group; when all payments are collected, the account owner would need to manually pay the bill, either directly from the group account or by withdrawing the funds and paying through an external payment source.

In other examples, the financial management systems and methods may be utilized for peer-to-peer lending. For instance, the loan marketplace may be an integrated external system and would manage all aspects of listing a loan, bidding on a loan and managing the loan. The financial management systems and methods may then be used to shift funds between lenders and lendees.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer-readable medium for execution by, or to control the operation of, data processing apparatus.

The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them, A propagated signal is an artificially generated signal, e.g., a machine-generated electrical, optical, or electromagnetic signal, that is generated to encode information for transmission to suitable receiver apparatus.

A computer program (also known as a program, software, software application, script, or code), can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., on or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of nonvolatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) to LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any from, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed o a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. For example, the actions recited in the claims can be performed in a different order and still achieve desirable results.

The invention claimed is:

1. A method performed by a payment processor that executes software instructions for creating and managing electronic payment accounts on a financial management system, the method comprising:
    associating an account with an account owner;
    receiving, through a user interface from the account owner, entries that specify
    a bill to be associated with the account,
        members of a group to be associated with the account,
        for each member, the respective member's share of a total amount of the bill, and
        different levels of account access for different members, the different levels of account access differing in terms of read-only access to see account status and recent activity, co-authority to request payments to the account from others, or approval authority for approving payment of the bill before the payment is processed;
    sending, by the payment processor, a request, to each member of the group, to receive the member's share of the total amount;
    receiving, by the payment processor, from each member, the member's share of the total amount; and
    paying the bill, by the payment processor, automatically upon receiving all of the shares of the total amount of the bill;
    wherein the bill is an itemized paperless bill delivered directly to the payment processor, and wherein the payment processor automatically allocates itemized amounts in the bill to individual members of the group;
    wherein the receiving steps, the sending step and the paying step are performed by the payment processor.

2. The method of claim 1 further comprising receiving the bill before the sending step, and wherein the sending is in response to receiving the bill.

3. The method of claim 2 further comprising, before the step of receiving entries through a user interface from the account owner, integrating the group account with an issuer of the bill such that the payment processor receives the bill directly from the issuer of the bill.

4. The method of claim 2 wherein the step of receiving entries through a user interface from the account owner includes receiving the bill through a user interface.

5. The method of claim 1 wherein the entries specify a time period for paying the bill on a recurring basis, and the sending recurs based on the time period.

6. The method of claim 1 wherein the sending of the request is through emails to the respective members.

7. The method of claim 1 wherein the bill is a rent bill, an electricity bill or a phone bill.

8. The method of claim 1 further comprising:
rendering the bill viewable by the members of the group.

9. The method of claim 1 further comprising:
communicating, to the members, a status indicator that indicates progress of receiving of the members' shares toward the total amount.

10. The method of claim 1 wherein the user interface is configured to input a total goal amount and to validate that the total goal amount matches a sum of the allocated members' shares.

11. The method of claim 1 wherein the entries that identify the members of the group are the respective members' email addresses.

12. The method of claim 1 wherein the entries specify a time limit for payment of the members' shares.

13. The method of claim 12 wherein the account is a primary account, and the method further comprising:
sending a request, to a member of the group, to open, for the member, a member account from which future payments to the primary account will be taken.

14. The method of claim 1 wherein the receiving of the member's share includes the payment processor withdrawing a member's share from an account opened by the member.

15. The method of claim 1 further comprising:
paying a dividend to each member on a recurring basis.

16. The method of claim 1 wherein the bill relates to a fundraising event for a charitable organization, and the account is an account of the charitable organization.

17. The method of claim 1 wherein the entries specify an activity whose completion will prompt the receiving of the members' shares.

18. The method of claim 17 further comprising:
receiving, from the user, an indication that the activity is completed; and
in response, automatically collecting the members' shares from accounts of the members.

* * * * *